United States Patent [19]

Trubiano

[11] 4,339,063

[45] Jul. 13, 1982

[54] CONTAINER BASKET FOR WHEELCHAIR

[76] Inventor: Antoine Trubiano, 1410 7th Ave., Pointe aux Trembles, Montreal, Quebec, Canada

[21] Appl. No.: 221,516

[22] Filed: Dec. 30, 1980

[51] Int. Cl.³ .......... B60R 9/00

[52] U.S. Cl. .......... 224/273; 224/42.43; 224/42.44

[58] Field of Search .......... 224/273, 42.42 R, 42.43, 224/42.44; 280/289 WC

[56] References Cited

U.S. PATENT DOCUMENTS 2,596,055 5/1952 Thomas .......... 280/289 WC 4,257,545 3/1981 Rhyan .......... 224/42.43

*Primary Examiner*—Steven M. Pollard

*Attorney, Agent, or Firm*—Oblon, Fisher, Spivak, McClelland & Maier

[57] ABSTRACT

A container basket adapted to be transported by a wheelchair. The container comprises a bottom wall and opposed side walls defining a container area. A frontal opening is provided for access to the basket to permit insertion of articles on the bottom wall. Support bracket means is secured under the bottom wall and connectable to at least one side armrest of a wheelchair for supporting the basket above the armrest and forwardly of a person occupying the wheelchair.

11 Claims, 8 Drawing Figures

Fig. 1
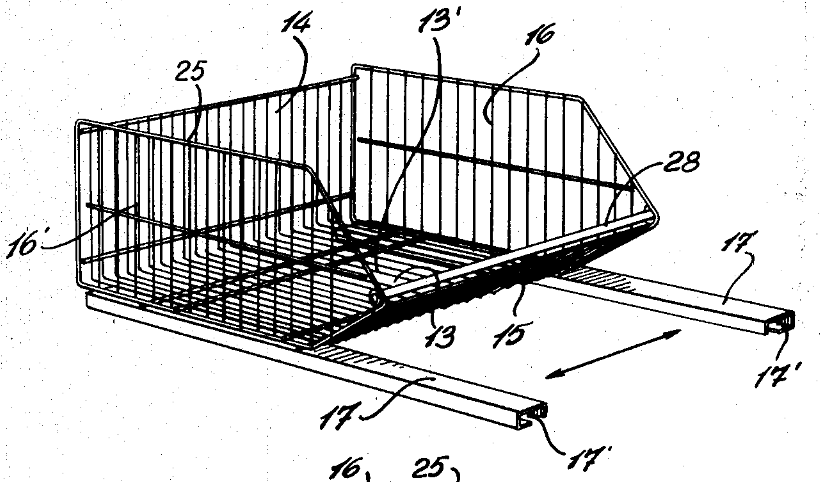
Fig. 2
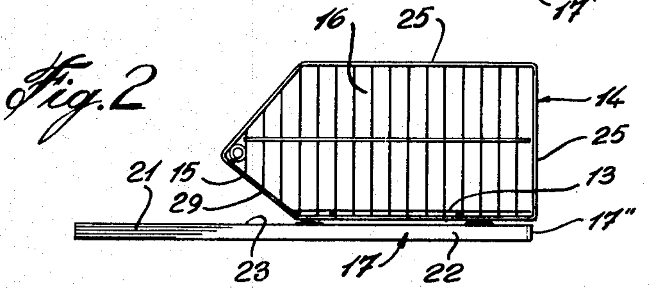
Fig. 3
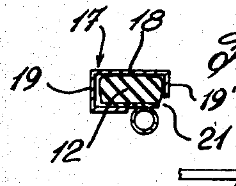
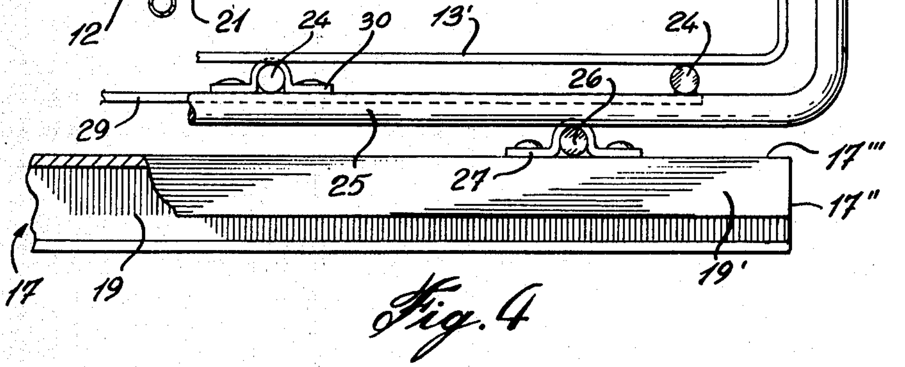
Fig. 4

Fig. 5
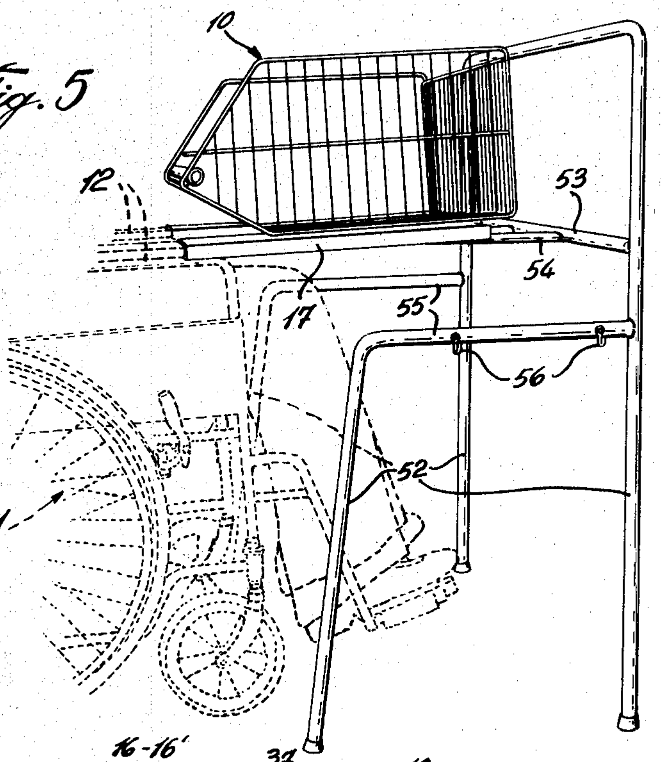
Fig. 6A
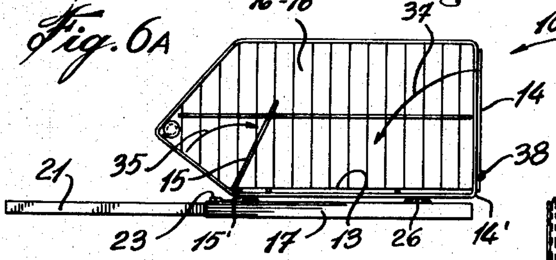
Fig. 7
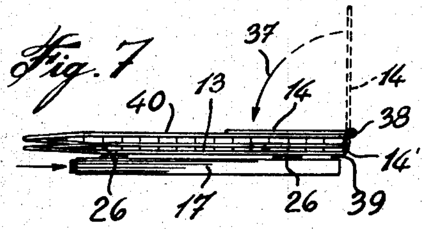
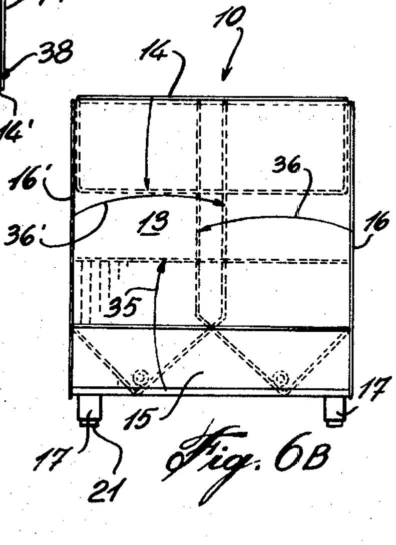
Fig. 6B

CONTAINER BASKET FOR WHEELCHAIR

BACKGROUND OF INVENTION (a) Field of Invention

The present invention relates to a container basket which is detachably securable to the armrests of a wheelchair for use by handicapped people to support articles therein.

(b) Description of Prior Art

There does not exist any convenient container basket, of the "shopping cart type", adapted particularly for handicapped people confined to wheelchairs. The majority of these handicapped people presently utilize the conventional shopping cart baskets which are supported on casters and have to push such baskets in the same manner as a person who is not handicapped. Because such handicapped persons are sitting on a wheelchair, their reach is much more restricted than a normal person and it is difficult for such a person to place goods in a conventional shopping cart as the side walls of the cart may be higher than his armpits and often such handicapped person has to drop an article, such as foodstuff, into the basket risking the article to break and cause damage to other articles in the basket or to himself. Furthermore, it is difficult for handicapped persons to have good visual access to the articles already in the basket to determine if any articles intended to be purchased are missing or if certain articles have already been picked up.

A still further disadvantage presented to handicapped people confined to wheelchairs is that these shopping carts are difficult to manoeuver particularly when a person is sitting on a wheelchair. Because of these difficulties to which handicapped people are subjected to, the majority of them do not venture into places, such as shopping plazas, where shopping carts are used and require another person to do their purchases. Often, such people will deprive themselves of necessary good rather than venture into a department store or grocery store because of the problem of using shopping carts.

SUMMARY OF INVENTION

It is therefore a feature of the present invention to provide a container basket which is adapted to be transported by a wheelchair and which is removably securable to the armrests of the wheelchair.

A further feature of the present invention is a container basket which permits ready access to its container area and wherein the area is completely visible to the user sitting in the wheelchair.

Another feature of the present invention is to provide a container basket which is easily secured and unsecured from the armrests of the wheelchair by the person sitting on the wheelchair.

A further feature of the present invention is to provide a container basket which is detachably securable to the armrests of a wheelchair by simply advancing the wheelchair with the armrest guided in elongated channel members secured under the container basket.

According to the above features, from a broad aspect, the present invention provides a container basket adapted to be transported by a wheelchair. The container comprises a bottom wall and opposed side walls defining a container area. A frontal opening is provided for access to the basket to permit insertion of articles on the bottom wall. Support bracket means is secured under the bottom wall and connectable to at least one side armrest of a wheelchair for supporting the basket above the armrest and forwardly of a person occupying the wheelchair.

BRIEF DESCRIPTION OF DRAWINGS

A preferred embodiment of the present invention will now be described with reference to the examples thereof as illustrated in the accompanying drawings in which:

FIG. 1 is a perspective view of the container basket of the present invention;

FIG. 2 is a side view of the container basket of the present invention showing a telescopic version of the channel members;

FIG. 3 is a cross-section view of one of the channel members showing the location of wheelchair armrest therein;

FIG. 4 is a fragmented side view showing the securement of the channel members to the container together with a protective wall under the basket bottom wall;

FIG. 5 is a perspective view showing a support frame for removably storing the container;

FIGS. 6A and 6B are schematical illustrations showing a container constructed with collapsible side walls; and FIG. 7 is a side view showing a bottom wall, herein a table top provided instead of a container bottom wall with side walls.

DESCRIPTION OF PREFERRED EMBODIMENTS

Referring now to the drawings and more particularly to FIGS. 1 and 2, there is shown generally at 10 the container basket of the present invention and adapted to be transported by the wheelchair 11 (see FIG. 5), and more particularly adapted to be removably secured to the armrests 12 thereof. The container comprises a bottom wall 13 and opposed side walls herein shown as a rear side wall 14, a front side wall 15 and opposed side walls 16 and 16', thus defining an open-ended container providing access to the container area whereby articles may be inserted therein on the bottom wall 13.

Support bracket means in the form of two elongated channel members 17 are displaceably secured under the bottom wall 13 and connectable to a respective one of the side arms 12 of the wheelchair 11 (see FIG. 5). Thus, the basket 10 may be supported above the armrest 12 forwardly of a person occupying the seat of the wheelchair 11.

Referring now additionally to FIGS. 3 and 4, there is shown the construction of the channel members 17. Each channel member is an elongated metallic frame formed with a top wall 18 and depending side walls 19 and 19'. An engagement means in the form of an inwardly turned wall portion 20 is provided in the lower edge of one of the side walls 19 and extends parallel to the top wall, and extends towards the other side wall 19'. The wall portion 20 extends a limited distance towards the other side wall to define a slot opening 21 extending longitudinally of the channel member 17 whereby the armrest 21 may be retained captive within a respective channel member 17 with a portion of the wall portion 20 extending under the armrest while the opposed side wall 19' abuts the side of the armrest 12. Thus, the armrest 12 is guided into the channel members from the open ends 17' thereof.

As shown in FIG. 6A the channel members 17 may be constructed as a telescopic channel member having an outer end portion 21 slidingly and telescopically received in an inner end portion 22 secured for transverse displacement under the container bottom wall 13. A suitable arresting means 23 is provided in the front portion of the inner end portion 22 and it consists of a spring lock (not shown) which, when the outer end portion 21 is pulled out, causes an engagement with the lock preventing the outer end portion 21 from being pushed back into the inner end portion 22, unless the lock 23 is depressed. The structure of this lock 23 is not shown as it is well known in the art and the arresting means can comprise various other types of arrangements to provide this interlocking, as is also well known in the art.

The basket of the present invention is constructed of wire mesh, although other suitable framework may be provided. As illustrated in FIGS. 1 and 4, the bottom wall is constituted by a plurality of equidistantly spaced apart chrome plated wires 13′ and these are welded on two spaced apart transverse rods 24. The side walls 16′ have a contour rod 25 which passes under the ends of the transverse rods 24 and two further transverse rods 26 are welded under and across the contour rods 25 beneath the bottom wall 13. The rods 26 are used to secure the channel members 17 for lateral sliding displacement. As shown in FIG. 4, a bracket 27 is secured to the top wall 17″ of the channel member 17 and passes over the transverse rod 26 whereby each channel member 17 is laterally displaceable in the directions of arrow 28 (FIG. 1) to provide adjustment for varying distances between opposed armrests of wheelchairs.

Referring again to FIG. 2 it can be seen that the front side wall 15 is shorter than the side wall 16 and angulated forwardly whereby to provide a larger frontal opening for access to the container area. A handle 28 is secured above the top edge of the front wall 15 to provide a handgrip for the user to slide the channel member 17 and consequently the basket, over the armrest of the wheelchair, and also facilitates removal of the basket therefrom. A protective solid wall 29, constructed of plastics or other suitable material, is conveniently secured under the front wall 15 and extends under the bottom wall 13 and located under the transverse rods 24 (see FIG. 4). This protective wall 29 may be secured by means of brackets 30 or other suitable securement means. The purpose of the wall 29 is to deflect any liquid spill thereon from the basket bottom wall, outwardly of the basket away from the person occupying the wheelchair. Thus, the person is protected from injury caused by broken articles or from having his clothing damaged by spilled liquids or foodstuffs. Also, the fact that the bottom wall 29 is spaced from the bottom wires 13′ is more sanitary and prevents foodstuff such as pieces of produce, from falling on the floor. The bottom wall 29 is easily cleaned by using a water spray through the bottom wires 13′.

Referring now to FIGS. 6A and 6B, it can be seen that the container 10 may be constructed with collapsible side walls. The front side wall 15 and the rear side wall 14 may be hingedly secured at their bottom edges 14′ and 15′ to end edges of the bottom wall 13. The opposed side walls 16 and 16′ are hinged to the vertical side edges of the rear wall and detachably secured to the front wall 15. Thus, all of the side walls may be folded onto the bottom wall 13 in the sequence illustrated in FIGS. 6A and 6B. First the front wall 15 is collapsed onto the bottom wall 13 in the direction of arrow 35. Then, the side walls 16 and 16′ are collapsed on the back wall 14 in the direction of arrows 36 and 36′ respectively, and then the rear wall 14 is collapsed over the bottom wall in the direction of arrow 37. To accommodate the side walls 16 and 16′ folded on the rear wall 14, the rear wall may be hingedly connected to the bottom wall at a position such as shown at 38 slightly elevated from the rear wall on a support rear wall portion.

In a further embodiment the basket side walls may be removed to provide a top wall only or the basket may be removed and replaced by a table top 40 having clamps 39 provided thereunder which clamp onto transverse rods 26. Of course, the bottom wall 13 of the basket could be formed as a solid bottom wall to constitute a table top 40 and the side walls 14, 15, 16 and 16′ may be removable from the bottom wall, thus achieving the table top concept, as shown in FIG. 7.

Referring now to FIG. 5, there is shown a support frame structure 50 which is used for removably storing one or more of the containers 10 in a position wherein the elongated channel members 17 are extending outwardly elevated from a floor 51 whereby the armrests of the wheelchair may be guided thereinto by simply advancing the wheelchair and guiding the armrests into the frontal opening 17′ of the channel members. The support frame 50 is constituted by opposed pairs of support legs 52 with a transverse rod 53 secured between the rear ones of the legs 52. Two spaced apart horizontal arms 54 are secured to the transverse arm 53 and project horizontally forwardly and spaced from the floor 51 a distance substantially equal to the height of armrests on conventional wheelchairs. These horizontal arms extend into the rear open end 17″ of the channel members to support the basket 10 when not in use. Should the armrests not be of the same height as the channel members 17, it is then only necessary to pull out the basket until it rests close to the free ends of the horizontal arms 54 and then the channel members 17 can be tilted upwardly or downwardly to slide into the armrest. A further cross member 55 is provided between the side pairs of legs 52 and is provided with hooks 56 whereby to hold a basket thereon when not in use. The spare baskets provided on each side of the support frame 50 are positioned onto the horizontal arms 54 when the basket formerly contained thereon is in use. Such replacement may be done by personnel employed by the department stores, etc.

It is within the ambit of the present invention to cover any obvious modifications of the examples of the preferred embodiment described herein, provided such modifications fall within the scope of the appended claims.

I claim:

1. A container basket adapted to be transported by a wheelchair, said container comprising a bottom wall and opposed side walls defining a container area, an opening for access to said basket to permit insertion of articles on said bottom wall, two elongated channel members secured under said bottom wall and connectable to at least one side armrest of a wheelchair for supporting said basket above said armrest and forwardly of a person occupying said wheelchair, each channel member being constructed to slidingly receive and retain a side armrest of opposed side arms of a wheelchair in a respective one of said channel members.

2. A container as claimed in claim 1 wherein said channel members are displaceably secured under said basket bottom wall; each channel member having a top wall, depending side walls and engagement means in a bottom end portion of at least one of said side walls to slidingly receive one of said side armrest.

3. A container as claimed in claim 2 wherein said engagement means is an inwardly turned portion of one of said side walls of each said channel members, said turned portion extending a limited distance toward said other side wall to define a slot opening between its free end and said other side wall along each said channel members.

4. A container as claimed in claim 3 wherein each said channel members is a telescopic channel member having an outer end portion slidingly received in an inner end portion secured for transverse displacement under said container bottom wall, and arresting means for locking said outer end portion with said inner end portion when extended outwardly thereof.

5. A container as claimed in claim 2 wherein at least one transverse rod is secured under said container bottom wall, at least one bracket secured outwardly of said top wall of each said two channel members, said bracket receiving said transverse rod therethrough to permit transverse displacement of said channel members to provide adjustment to permit securement to armrests having different spacing therebetween.

6. A container as claimed in claim 5 wherein a front one of said container opposed side walls is shorter in height than the other side walls to provide said frontal opening thereabove, said container being open ended at the top thereof.

7. A container as claimed in claim 6 wherein said front side wall is sloped forwardly, a handle member provided adjacent a top edge of said front side wall to provide a handgrip to slide said channel members over said armrests of said wheelchair and to remove said basket therefrom.

8. A container as claimed in claim 6 wherein said container opposed side walls are hingedly interconnected together, said front side wall and rear side wall being hinged along their bottom edge to a respective edge of said container bottom wall, said front side wall being detachably secured to a front vertical edge of the other two opposed side walls, all said side walls being collapsible on said container bottom wall.

9. A container as claimed in claim 5 wherein a protective solid wall is secured under said basket bottom wall above said at least one transverse rod to deflect any liquids spilled thereon from said basket bottom wall outwardly of said basket away from a person occupying a wheelchair to which said basket is secured.

10. A container as claimed in claim 5 wherein there is provided two spaced apart transverse rods to which said two channel members are displaceably secured thereto, said basket being detachably secured to said two spaced apart transverse rods, and a table top frame securable to said transverse rods.

11. A container as claimed in claim 2 wherein there is further provided a support frame for removably storing one of said containers in a position wherein said elongated channel members are extending outwardly elevated from a floor whereby the armrests of a wheelchair may be guided thereinto by advancing said wheelchair toward said basket frontal opening, said support frame having support legs for maintaining two spaced apart horizontal arms forwardly extending whereby to be received in a respective one of said channel members from an opposed open end than that for receiving said armrests.

* * * * *